United States Patent [19]

Tsubaki et al.

[11] Patent Number: 5,333,148
[45] Date of Patent: Jul. 26, 1994

[54] DATA RECEIVER

[75] Inventors: Kazuhisa Tsubaki; Kouji Abe; Mitsuru Uesugi; Kouichi Honma, all of Yokohama, Japan

[73] Assignee: Matsushita Electric Industrial Co., Ltd., Osaka, Japan

[21] Appl. No.: 843,934

[22] Filed: Feb. 25, 1992

[30] Foreign Application Priority Data

Mar. 7, 1991 [JP] Japan .................................. 3-041717

[51] Int. Cl.$^5$ ........................ H03D 1/00; H03H 7/30; H04L 27/06; H04L 7/00
[52] U.S. Cl. ........................................ 375/11; 375/94; 375/114; 329/304
[58] Field of Search ..................... 375/11, 12, 94, 114, 375/116; 370/105.1; 333/18, 28 R; 329/300, 304

[56] References Cited

U.S. PATENT DOCUMENTS 4,745,622 5/1988 Gupta .............................. 375/60 X Primary Examiner—Curtis Kuntz
Assistant Examiner—Tesfaldet Bocure
Attorney, Agent, or Firm—Stevens, Davis, Miller and Mosher

[57] ABSTRACT

A data receiver which enhances a probability of frame synchronization even if a transmission line quality is bad detects a specific bit sequence in a received signal demodulated by a demodulator to deduce a transmission line quality by a line quality deducer. If the transmission line quality is so bad that a frame synchronization detector cannot detect the specific bit sequence, the specific bit sequence is detected from a received signal demodulated by an equalizer after the elimination of a transmission line distortion.

7 Claims, 2 Drawing Sheets

DATA RECEIVER

BACKGROUND OF THE INVENTION

The present invention relates to a data receiver used for a digital portable telephone set, a digital automobile telephone set, and the like.

It has been generally attempted in the digital portable telephone set, the digital automobile telephone set and so on to activate a receiving unit at a predetermined interval and deactivate it in the remaining intervals in order to reduce power consumption.

FIG. 1 shows a block diagram of a prior art data receiver. Numeral 21 denotes a demodulator for demodulating a received signal, and numeral 22 denotes a frame synchronization detector for detecting a specific bit sequence from the demodulated data to generate a timing signal to effect framing. FIG. 2 shows a structure of the demodulated received signal processed in such a data receiver. A synchronizing word or unique word 23 comprising the specific bit sequence which is used for synchronizing the received data and a data field 24 for storing data of voice or facsimile form one slot 25, and three slots 25a, 25b and 25c form one frame 26. The unique word 23 comprises 20 bits, the data field 24 comprises 260 bits and the frame length is of 20 ms.

The operation of the prior art is explained below. When the demodulator 21 receives a signal, it demodulates data by coherent demodulation, differential detection or others. The frame synchronization detector 22 calculates a correlation between the unique word of the demodulated data and a predetermined reference unique word, and if the correlation meets a predetermined condition, it starts a frame synchronization mode to process data frame by frame. During the frame processing, the correlation between the unique words is periodically calculated, every 3 slots in this case, and if the correlation is not maintained, it returns to a frame asynchronization mode. In the example shown in FIG. 2, when the first unique word 23a of the frame 26 is detected, the receiver is not activated during the rest period of the frame 26 and it is reactivated at the start of the next frame.

In the prior art data receiver, only when there is no error in the demodulated data from the demodulator and the specific bit sequence is periodically detected, the frame synchronization mode is started to receive the data for frame processing.

However, in the prior art data receiver, since errors may be included in the demodulated data from the demodulator 21 because of a waveform distortion created by a transmission line and a noise added to the data, the frame processing in the frame synchronization mode cannot be continued for a long period.

SUMMARY OF THE INVENTION

It is an object of the present invention to provide a data receiver which can maintain a high frame synchronization probability even under a poor transmission line quality.

In order to achieve the above object, the data receiver of the present invention comprises a demodulator for demodulating data from a received signal and producing error information for deducing a transmission line quality, a line quality deducer for deducing the transmission line quality based on the received signal and the error information, an equalizer for demodulating the received signal and eliminating a transmission line distortion, a frame synchronization detector for detecting a specific bit sequence from the demodulated data to generate a timing signal for frame processing and a selector for selecting the demodulated data of the demodulator or the demodulated data of the equalizer. When the specific bit sequence is not detected by the degradation of the line quality, the equalizer is activated to enhance the frame synchronization probability.

In the present invention, the transmission line quality is measured based on the received signal and the error signal from the demodulator, and if the line quality is bad, the received signal is demodulated by the demodulator and the received signal is supplied to the equalizer. If the specific bit sequence is not detected from the demodulated data of the demodulator, the equalizer is activated to correct the error in the demodulated data due to the transmission line distortion and detect the specific bit sequence. In this manner, the probability of the frame processing is enhanced.

DESCRIPTION OF THE PREFERRED EMBODIMENT

Figure 1:
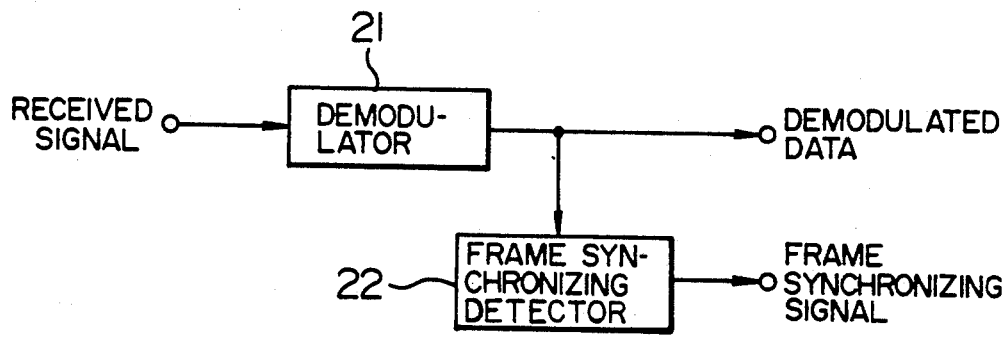
FIG. 1 shows a block diagram of a prior art data receiver.
Figure 2:
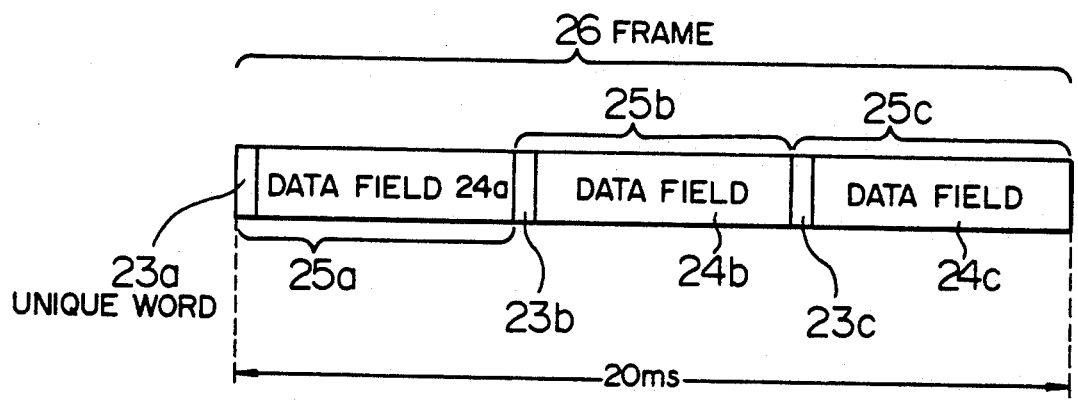
FIG. 2 shows structure of one frame of received data after demodulation which is processed in a data receiver.
Figure 3:
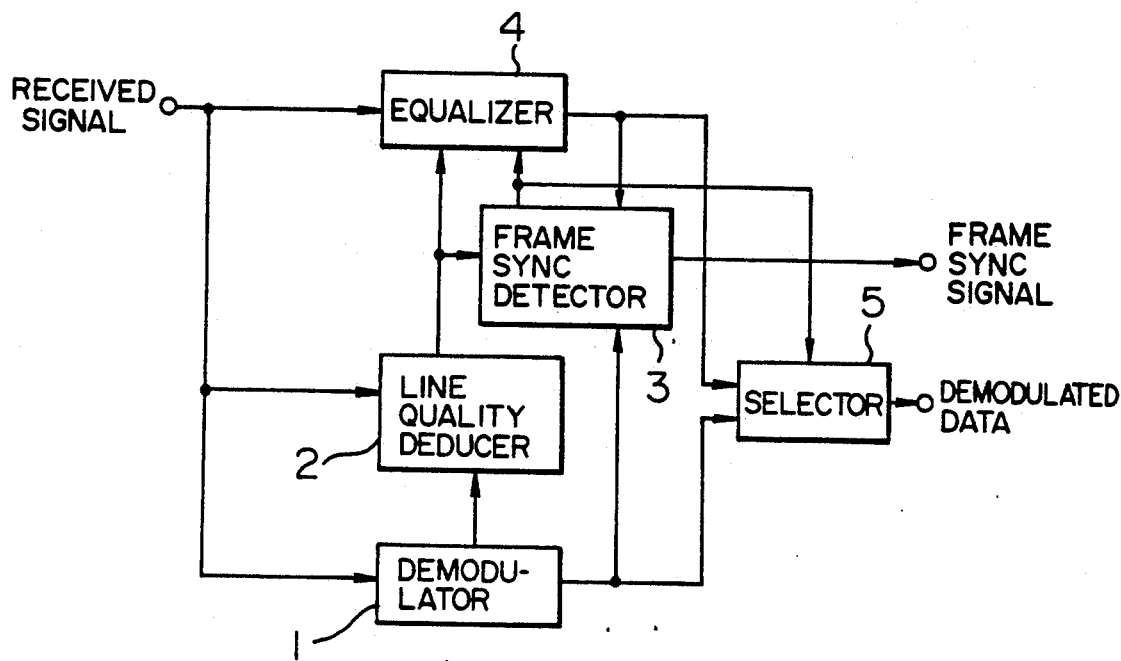
FIG. 3 shows a block diagram of one embodiment of a data receiver of the present invention.
Figure 4:
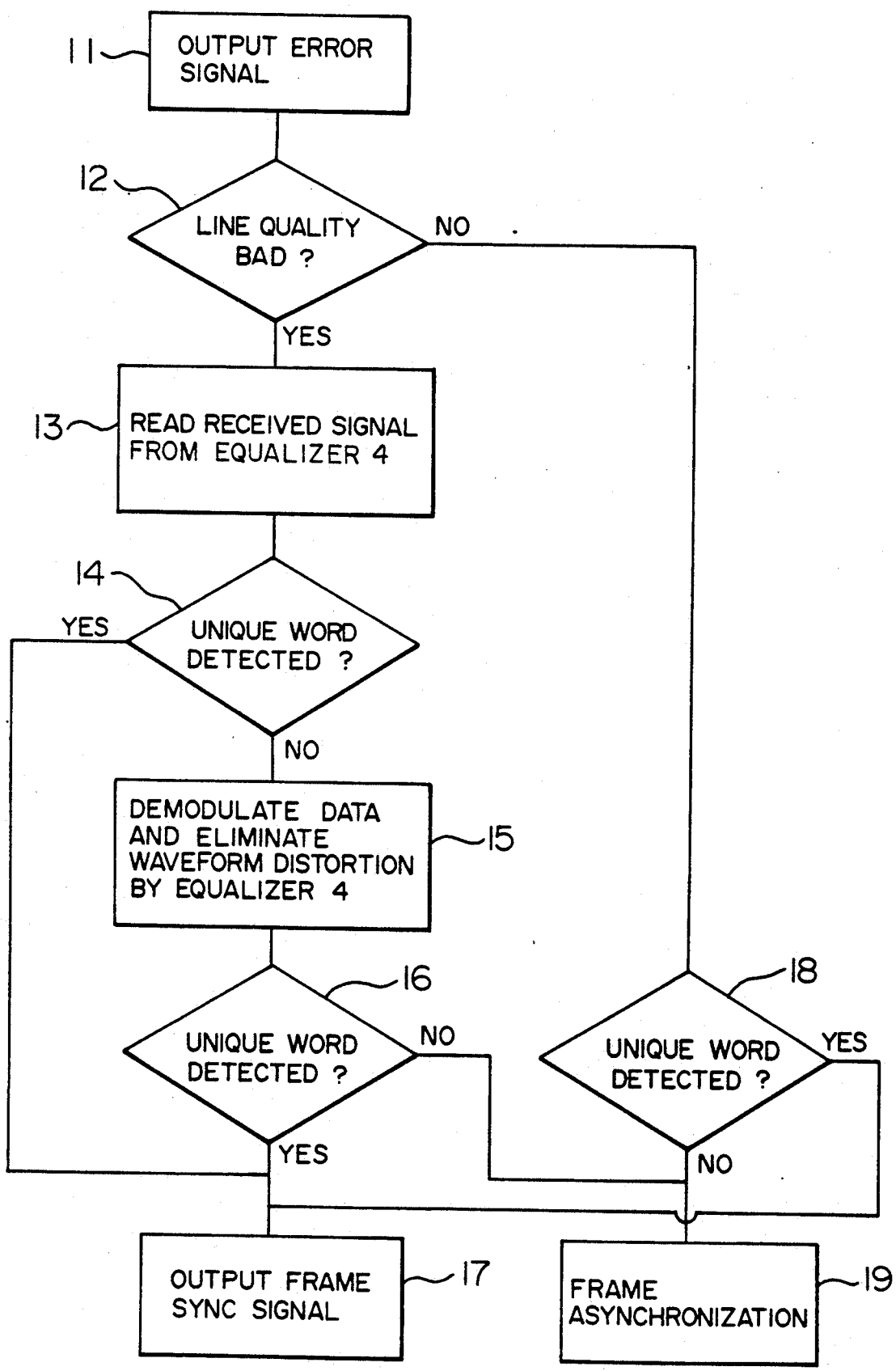
FIG. 4 shows a flow chart of an operation of the data receiver in the embodiment.

FIG. 3 shows a block diagram of one embodiment of the present invention, and FIG. 4 shows a flow chart of an operation of the embodiment. In FIG. 3, numeral 1 denotes a demodulator for demodulating data from a received signal. Numeral 2 denotes a line quality deducer for deducing a transmission line quality based on the received signal and an error signal from the demodulator 1. Numeral 3 denotes a frame synchronization detector for calculating a correlation with a specific bit sequence based on the demodulated data from the demodulator 1 to produce a frame synchronizing signal for periodic frame processing. Numeral 4 denotes an equalizer for demodulating data from the received signal by eliminating waveform distortion. Numeral 5 denotes a selector for selecting the demodulated data of the demodulator 1 or the demodulated data of the equalizer 4.

An operation of the present embodiment is now explained. When the received signal is applied, the demodulator 1 demodulates the received signal by synchronous detection, delayed detection or other adequate detecting technology and produces an error signal which represents an error between the demodulated signal and a reference signal used as a discrimination reference (step 11). When the error signal in a given duration is larger than a predetermined level $a$, the line quality deducer 2 determines that the line quality has been deteriorated and command the equalizer 4 to read in the received signal to demodulate it (steps 12 and 13). The frame synchronization detector 3 calculates the correlation between the unique word 23 of the demodulated data from the demodulator 1 and a predetermined reference word, namely, it determines if the predetermined bit sequence is included or not to detect the unique word 23 (step 14). For example, if there is matching of no less than 18 bits between the 20-bit unique word 23 and the reference word, it is determined that there exists a correlation between then and the detected unique word 23 is determined to the unique word to be detected. Once the unique word 23 is detected, the frame synchronizing signal for the periodic frame processing is produced. Thereafter, whether the unique words are detected periodically (every three slots in the embodiment) or not is checked. If any unique word is not detected in spite of a high quality of the transmission line, the frame asynchronization mode is started (step 19).

If the demodulated data is in error and the unique word is not detected due to a noise in the transmission line, the frame synchronization detector 3 produces a signal to activate the equalizer 4. The equalizer 4 is activated when the transmission line quality is so bad that the unique word 23 is not detected to demodulate the received signal by the coherent demodulation, the differential detection or other detection, and eliminate the waveform distortion created in the transmission line from the demodulated signals (step 15). When the equalizer 4 is activated, the frame synchronization detector 3 detects the unique word again by using the demodulated data after the equalization by the equalizer 4 (step 16). If the unique word is not detected in this process, an out-of-synchronization is determined. When the equalizer 4 is used to detect the unique word because the line quality is too bad, the selector 5 selects the demodulated data of the equalizer 4 as the final demodulated data, and when the equalizer 4 is not activated, it selects the demodulated data of the demodulator 1 as the final demodulated data.

In accordance with the present embodiment, when the line quality is so bad that the unique word in the demodulated data from the demodulator 1 is not detected, the equalizer 4 is activated to correct the error in the demodulated data due to the transmission line distortion to enhance the probability of detection of the specific bit sequence. Accordingly, the probability of performing periodic frame processing is enhanced.

While the degradation of the line quality is detected when the error signal in the given duration is larger than the predetermined level in the present embodiment, the error signal may be compared with a plurality of levels (for example, $\alpha$, $\beta$ and $\gamma$ where $\alpha > \beta > \gamma$) and the operation condition of the equalizer may be changed depending on the level of the error signal.

What is claimed is:

1. A data receiver which receives an input signal and outputs a data signal and a frame synchronization signal for frame processing of said data signal, said data receiver comprising:
    a demodulator for receiving said input signal, demodulating data from said input signal to produce a first demodulated data output and producing error information for deducing a transmission line quality;
    a line quality deducer for receiving said input signal and deducing the transmission line quality base don the error information and the input signal to produce a transmission line quality signal;
    an equalizer for receiving said input signal and deducing the transmission line quality based on the error information and the input signal to produce a transmission line quality signal;
    a frame synchronization detector for receiving said first demodulated data output and said second demodulated data output and detecting a specific bit sequence from the first demodulated data output or the second demodulated data output and producing and outputting said frame synchronization signal; and
    a selector for selecting the first demodulated data output or the second demodulated data output as said data signal in accordance with said transmission line quality signal and outputting said data signal.

2. A data receiver according to claim 1, wherein said equalizer is activated when the transmission line quality is bad.

3. A data receiver according to claim 1, wherein said demodulator demodulates the data by coherent demodulation of differential detection.

4. A data receiver according to claim 1, wherein said frame synchronization detector detects said specific bit sequence in a unique word of the first demodulated data output or the second demodulated data output.

5. A data receiver according to claim 4, wherein said frame synchronization detector detects said specific bit sequence by matching at least part of said specific bit sequence with a reference word.

6. A data receiver according to claim 1, wherein said line quality deducer deduces the transmission line quality by comparing the error information with a predetermined level.

7. A data receiver according to claim 1, wherein said line quality deducer deduces the transmission line quality by comparing the error information with a plurality of predetermined levels.

* * * * *